United States Patent
Revuri et al.

(10) Patent No.: US 12,549,345 B2
(45) Date of Patent: Feb. 10, 2026

(54) PASSWORD RESET

(71) Applicant: Dell Products L.P., Round Rock, TX (US)

(72) Inventors: Chandrasekhar Revuri, Bangalore (IN); Rama Rao Bisa, Bangalore (IN); Bala Balaji Gupta M, Bangalore (IN); Mini Thottunkal Thankappan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 278 days.

(21) Appl. No.: 18/158,648

(22) Filed: Jan. 24, 2023

(65) Prior Publication Data

US 2024/0250813 A1    Jul. 25, 2024

(51) Int. Cl.
*H04L 9/08* (2006.01)
*H04L 9/06* (2006.01)
*H04L 9/32* (2006.01)

(52) U.S. Cl.
CPC .......... *H04L 9/0863* (2013.01); *H04L 9/0631* (2013.01); *H04L 9/3226* (2013.01); *H04L 9/3247* (2013.01)

(58) Field of Classification Search
CPC ... H04L 9/0863; H04L 9/0631; H04L 9/3226; H04L 9/3247; H04L 9/0891
See application file for complete search history.

(56) References Cited

U.S. PATENT DOCUMENTS

| | | | | |
|---|---|---|---|---|
| 10,826,875 B1* | 11/2020 | Kim | ............... | H04L 63/0428 |
| 2013/0246787 A1* | 9/2013 | Everett | ............... | H04L 12/6418 |
| | | | | 713/164 |
| 2014/0364099 A1* | 12/2014 | Pai | ............... | G06F 21/88 |
| | | | | 455/418 |
| 2020/0092107 A1* | 3/2020 | Cole | ............... | G06F 21/6245 |
| 2020/0329062 A1* | 10/2020 | Beauchesne | ............... | H04L 63/105 |
| 2021/0406376 A1* | 12/2021 | Sayapin | ............... | G06F 21/572 |
| 2022/0393867 A1* | 12/2022 | Thirumalai | ............... | H04L 9/0643 |
| 2024/0054494 A1* | 2/2024 | Hirshon | ............... | G06F 21/34 |
| 2024/0135040 A1* | 4/2024 | Vaassen | ............... | G06F 21/64 |

* cited by examiner

*Primary Examiner* — Farid Homayounmehr
*Assistant Examiner* — Suman Debnath
(74) *Attorney, Agent, or Firm* — Jackson Walker L.L.P.

(57) ABSTRACT

An information handling system may include at least one processor and a memory. The information handling system may be configured to: receive a password reset request associated with a machine identifier of a target information handling system; and in response to the password reset request, provide a payload, wherein the payload includes: an encrypted reset command encrypted with a first key; a wrapped version of the first key, wherein the wrapped version of the first key is encrypted with a public key associated with the target information handling system; and a cryptographic signature; wherein in response to receiving the payload, the target information handling system is configured to verify the cryptographic signature, unwrap the wrapped version of the first key with a private key associated with the public key, decrypt the encrypted reset command, and allow a password reset.

9 Claims, 2 Drawing Sheets

PASSWORD RESET

TECHNICAL FIELD

The present disclosure relates in general to information handling systems, and more particularly to techniques for resetting passwords in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

This disclosure describes techniques for securely resetting a password on an information handling system. For example, some embodiments may be employed to reset a password on a host system, while others may be employed to reset a password on a management controller.

Some such systems may include a default password (which may be printed on a label affixed to the system in some cases) that a user may want to change, and physically visiting the system may be impractical (e.g., in a datacenter environment). In other situations, a password may be forgotten and a reset needed, etc. Embodiments of this disclosure provide a way of securely performing such password resets over a potentially untrusted communication channel without the need to physically visit the system in question.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with password resets in information handling systems may be reduced or eliminated.

In accordance with embodiments of the present disclosure, an information handling system may include at least one processor and a memory. The information handling system may be configured to: receive a password reset request associated with a machine identifier of a target information handling system; and in response to the password reset request, provide a payload, wherein the payload includes: an encrypted reset command encrypted with a first key; a wrapped version of the first key, wherein the wrapped version of the first key is encrypted with a public key associated with the target information handling system; and a cryptographic signature; wherein in response to receiving the payload, the target information handling system is configured to verify the cryptographic signature, unwrap the wrapped version of the first key with a private key associated with the public key, decrypt the encrypted reset command, and allow a password reset.

In accordance with these and other embodiments of the present disclosure, a method may include an information handling system receiving a password reset request associated with a machine identifier of a target information handling system; and in response to the password reset request, the information handling system providing a payload, wherein the payload includes: an encrypted reset command encrypted with a first key; a wrapped version of the first key, wherein the wrapped version of the first key is encrypted with a public key associated with the target information handling system; and a cryptographic signature; wherein in response to receiving the payload, the target information handling system verifies the cryptographic signature, unwraps the wrapped version of the first key with a private key associated with the public key, decrypts the encrypted reset command, and allows a password reset.

In accordance with these and other embodiments of the present disclosure, an article of manufacture may include a non-transitory, computer-readable medium having computer-executable code thereon that is executable by a processor of an information handling system for: receiving a password reset request associated with a machine identifier of a target information handling system; and in response to the password reset request, providing a payload, wherein the payload includes: an encrypted reset command encrypted with a first key; a wrapped version of the first key, wherein the wrapped version of the first key is encrypted with a public key associated with the target information handling system; and a cryptographic signature; wherein in response to receiving the payload, the target information handling system is configured to verify the cryptographic signature, unwrap the wrapped version of the first key with a private key associated with the public key, decrypt the encrypted reset command, and allow a password reset.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
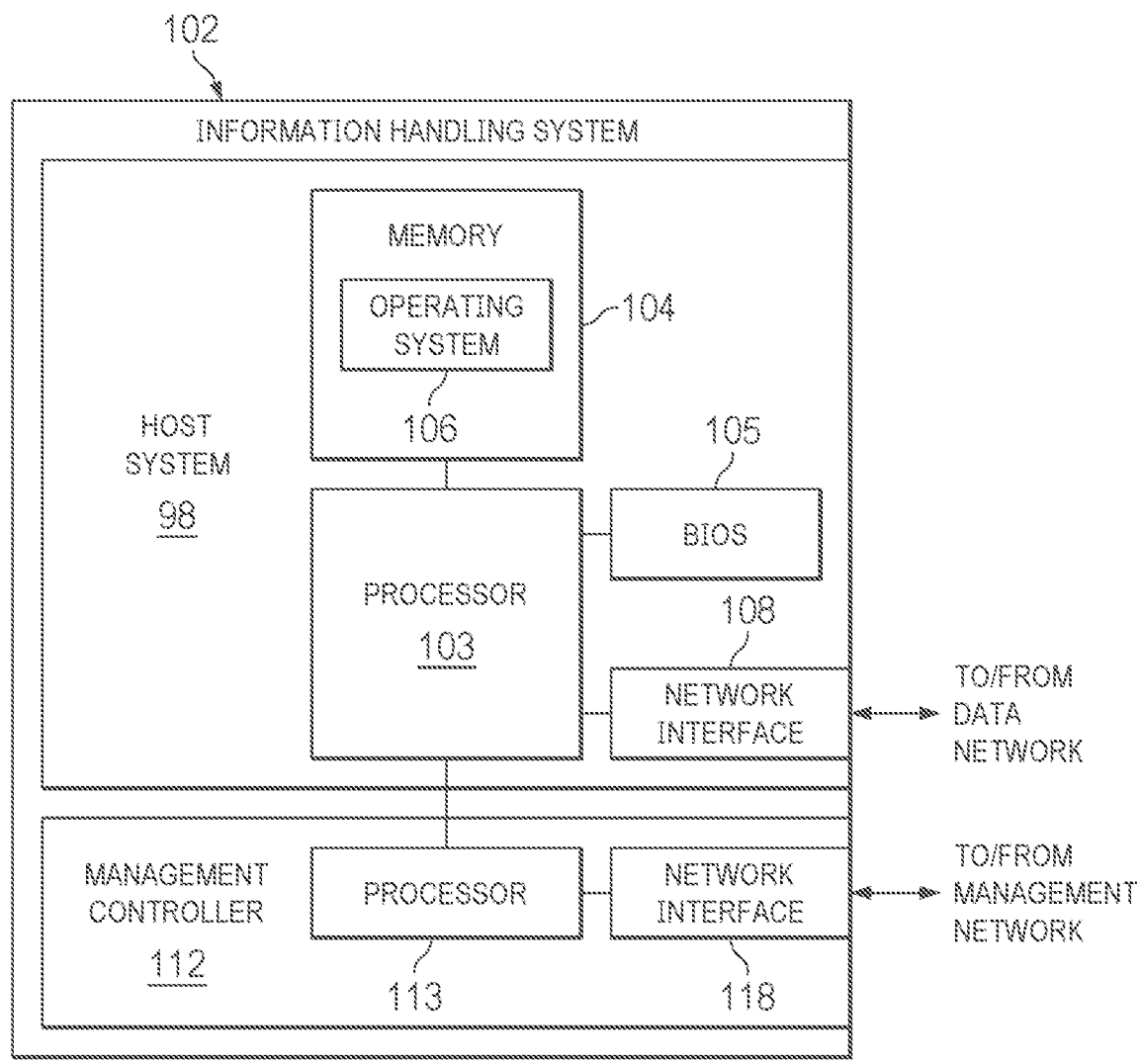
FIG. 1 illustrates a block diagram of an example information handling system, in accordance with embodiments of the present disclosure.
Figure 2:
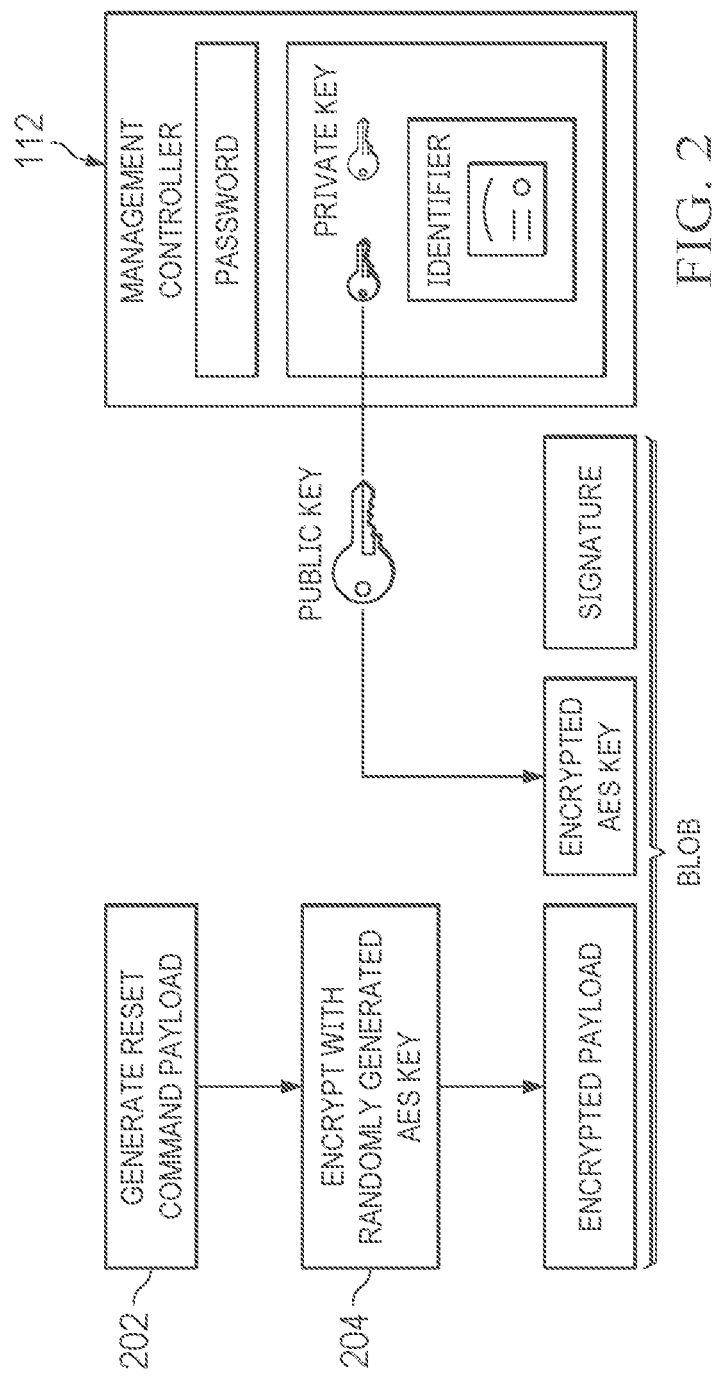
FIG. 2 illustrates an example method, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives, solid-state drives, and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microcontroller, digital microprocessor, signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide techniques for resetting a password associated with information handling system 102. For example, the password may be associated with host system 98 or with management controller 112. In the following section, the latter embodiment is discussed in detail for the sake of clarity and concreteness. However, the former embodiment is also specifically contemplated herein, as well as embodiments in which a password is reset for another type of information handling system.

Password resets according to this disclosure may be implemented via the use of a remote information handling system (e.g., a cloud-based system associated with a manufacturer, retailer, wholesaler, etc.). Such a remote information handling system may be referred to herein as a "factory" system.

In one embodiment, prior to being shipped to a customer, management controller 112 may be provisioned by a factory system with a default password, as well as a cryptographic certificate, which may include a public key, a private key, and a machine identifier (e.g., a service tag, serial number, or the like). The factory system may also retain records regarding the identifier and the public key, which may be used as described herein to securely manage password resets. Typically, although not necessarily, the factory system may not retain records of the private key.

As described in more detail below, an administrator of management controller 112 may initiate a secure password reset by contacting a factory portal such as a management website. This communication may be secured in any suitable manner, such as via a login that may be based on a username and password. In one embodiment, the login may be pre-associated with management controller 112 (e.g., at the point of sale or shortly thereafter).

Once authenticated via the factory portal, the administrator may initiate a password reset by providing the machine identifier for management controller 112. The factory system may determine whether the administrator's login is properly associated with management controller 112. If so, the factory system may then perform a password reset by creating a signed, encrypted instruction (a signed blob) that may be verified and executed by management controller 112.

Turning now to FIG. 2, an example method 200 is shown for performing a secure password reset, according to some embodiments. Method 200 may be carried out by a factory system that has received a password reset request from an administrator of a management controller 112 and verified that the administrator's login has the rights to obtain such a reset.

At step 202, the factory system may first generate a password reset command payload. For example, the payload may include instructions that are executable by management controller 112 to initiate the password reset.

At step 204, the factory system may encrypt the payload with a cryptographic key. For example, in one embodiment, the key may be randomly generated, and the encryption scheme may be AES. Additionally, the factory system may wrap the AES key itself by encrypting it with the public key of management controller 112. The use of a wrapped key may ensure that only the correct management controller is able to use the payload.

The payload encrypted by the AES key, together with the wrapped AES key may then be digitally signed with the factory system's private key. The result may be combined into a blob that may be returned to the administrator who requested the password reset. For example, the administrator may be able to download the blob via the factory portal.

In some embodiments, the blob may include a nonce value designed to limit its reuse. Further, the cryptographic signature may be configured for only a limited time period of validity.

Once the administrator has received the blob, it may be uploaded to management controller 112. For example, the administrator may access a user interface of management controller 112 and select a password reset option, which may provide the option of uploading the blob. Management controller 112 may verify the factory signature's validity. Further, management controller 112 may decrypt the encrypted AES key by using its own private key, and then use the decrypted AES key to decrypt the payload. The payload may then be inspected to ensure that it is tied to the correct machine identifier for management controller 112.

Once the verification process has succeeded, management controller 112 may execute the reset command payload, prompting the administrator for a new password and accepting the result.

In some embodiments, management controller 112 may be configured to disallow reuse of a given password reset blob. For example, management controller 112 may retain a record associated with the blob when it is used, and check that record prior to allowing any subsequent password resets.

One of ordinary skill in the art with the benefit of this disclosure will understand that the preferred initialization point for the method depicted in FIG. 2 and the order of the steps comprising the method may depend on the implementation chosen. In these and other embodiments, the method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the methods.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a memory;
wherein the information handling system is configured to:
receive, at a management website, a password reset request associated with a machine identifier of a target information handling system, wherein the target information handling system is a management controller configured to provide out-of-band management of a host system, and wherein the password reset request is associated with login information for the management website;
verify that the login information is associated with the machine identifier of the target information handling system; and
in response, provide a payload, wherein the payload includes:
an encrypted reset command, wherein a reset command is encrypted with a first key to generate the encrypted reset command;
a wrapped version of the first key, wherein the wrapped version of the first key is encrypted with a public key associated with the target information handling system; and
a cryptographic signature;
wherein in response to receiving the payload, the target information handling system is configured to verify the cryptographic signature, unwrap the wrapped version of the first key with a private key associated with the public key, decrypt the encrypted reset command, execute the reset command to initiate a password reset, and store a record associated with the password reset request, wherein the record is configured to prevent subsequent reuse of the password reset request, and wherein executing the reset command is configured to cause the target system to prompt a user for a new password.

2. The information handling system of claim 1, wherein the first key as an AES key.

3. The information handling system of claim 1, wherein the cryptographic signature is configured to be verifiable for a predetermined amount of time.

4. A method comprising:
an information handling system, at a management website, a password reset request associated with a machine identifier of a target information handling system, wherein the target information handling system is a management controller configured to provide out-of-band management of a host system, and wherein the password reset request is associated with login information for the management website;
the information handling system verifying that the login information is associated with the machine identifier of the target information handling system; and
in response, the information handling system providing a payload, wherein the payload includes:
an encrypted reset command, wherein a reset command is encrypted with a first key to generate the encrypted reset command;
a wrapped version of the first key, wherein the wrapped version of the first key is encrypted with a public key associated with the target information handling system; and
a cryptographic signature;
wherein in response to receiving the payload, the target information handling system verifies the cryptographic signature, unwraps the wrapped version of the first key with a private key associated with the public key, decrypts the encrypted reset command, executes the reset command to initiate a password reset, and stores a record associated with the password reset request, wherein the record is configured to prevent subsequent resue of the password reset request, and wherein executing the reset command is configured to cause the target system to prompt a user for a new password.

5. The method of claim 4, wherein the first key as an AES key.

6. The method of claim 4, wherein the cryptographic signature is configured to be verifiable for a predetermined amount of time.

7. An article of manufacture comprising a non-transitory, computer-readable medium having computer-executable code thereon that is executable by a processor of an information handling system for:

receiving, at a management website, a password reset request associated with a machine identifier of a target information handling system, wherein the target information handling system is a management controller configured to provide out-of-band management of a host system, and wherein the password reset request is associated with login information for the management website;

verifying that the login information is associated with the machine identifier of the target information handling system; and in response, providing a payload, wherein the payload includes:

an encrypted reset command, wherein a reset command is encrypted with a first key to generate the encrypted reset command;

a wrapped version of the first key, wherein the wrapped version of the first key is encrypted with a public key associated with the target information handling system; and a cryptographic signature;

wherein in response to receiving the payload, the target information handling system is configured to verify the cryptographic signature, unwrap the wrapped version of the first key with a private key associated with the public key, decrypt the encrypted reset command, execute the reset command to initiate a password reset, and store a record associated wit the password reset request, wherein the record is configured to prevent subsequent reuse of the password reset request, and wherein executing the reset command is configured to cause the target system to prompt a user for a new password.

8. The article of claim 7, wherein the first key as an AES key.

9. The article of claim 7, wherein the cryptographic signature is configured to be verifiable for a predetermined amount of time.

* * * * *